United States Patent [19]

Blodgett et al.

[11] 4,309,109

[45] Jan. 5, 1982

[54] PULSED INTERFEROMETRIC REMOTE GAUGE

[75] Inventors: Jerry A. Blodgett, Annandale, Va.; Raymond A. Patten, Oxon Hill, Md.

[73] Assignee: The United States of America as represented by the Secretary of the Navy, Washington, D.C.

[21] Appl. No.: 257,997

[22] Filed: May 25, 1972

[51] Int. Cl.³ ............................................. G01B 11/02
[52] U.S. Cl. .................................. 356/355; 356/352; 356/356
[58] Field of Search .................. 356/4, 5, 106 R, 108, 356/4.5, 357, 358, 355, 356, 352

[56] References Cited

U.S. PATENT DOCUMENTS 3,127,465 3/1964 Stephens ........................ 356/106 R
3,319,515 5/1967 Flournoy ............................ 356/108

Primary Examiner—S. C. Buczinski
Attorney, Agent, or Firm—Robert F. Beers; William T. Ellis; Philip Schneider

[57] ABSTRACT

The invention comprises a method and means for measuring the separation between two optical surfaces. A short-coherence-length laser pulse is projected upon two optical surfaces separated by a distance, d. The reflected, coincident beams are directed into a Michelson interferometer in which one plane mirror is replaced by a stepped mirror. The beams reflected from the two mirrors are directed onto a film where they form interference images. A formula using the number of channels, n, between successive interference fringes and the step width of the stepped mirror is used to calculate d.

4 Claims, 6 Drawing Figures

PULSED INTERFEROMETRIC REMOTE GAUGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to apparatus for measuring the separation between two light-reflecting surfaces and especially to apparatus using a pulsed-laser technique for measuring the separation between two light-reflecting surfaces.

One pulsed method employed for measuring the separation between optical surfaces uses ultrashort light pulses. If the arrival times of the reflections from the optical surfaces can be measured to sufficient accuracy, then the surface separations can be determined. Picosecond pulses can now be generated but timing circuitry limits the resolution of surface separations to the order of a centimeter at best. In addition, extremely high peak powers are employed in order to provide sufficient energy for detection but these high peak powers can cause air breakdown and possible damage to the optical system being probed.

A second method, closely related to the technique to be described herein, employs high resolution photographic film as the detector. Since high-resolution film is required, this technique is relatively insensitive because the energy necessary to expose these films is quite large. In addition, the available films only operate in the visible region of the spectrum.

BRIEF SUMMARY OF THE INVENTION

The objects and advantages of the present invention are accomplished by irradiating a pair of spaced optical surfaces with a laser pulse, receiving the reflected beam in a Michelson interferometer in which one of the plane mirrors is replaced by a stepped mirror, and combining the beams reflected by the two mirrors on a recording device such as a photographic film to form an interference pattern thereon.

An object of the invention is to measure the separation between two optical surfaces.

Another object is to measure the separation between two optical surfaces by means of a single laser pulse.

A further object is to measure the separation between two optical surfaces by means of a single laser pulse and with low-resolution photographic film.

Other objects, advantages and novel features of the invention will become apparent from the following detailed description of the invention when considered in conjunction with the accompanying drawings wherein:

DETAILED DESCRIPTION

Figure 1:
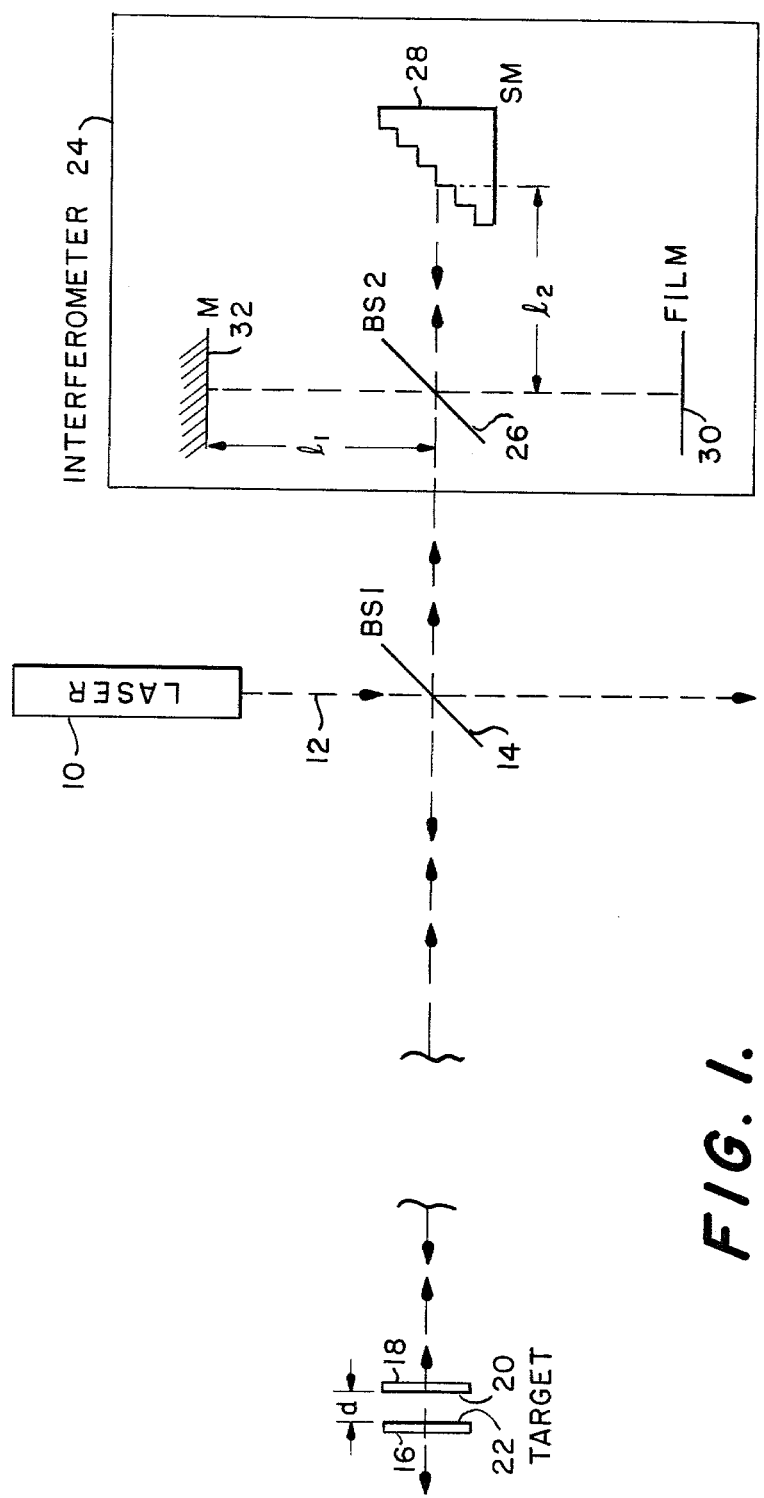
FIG. 1 is a schematic illustration of an embodiment of the invention.

In one embodiment of the invention (FIG. 1), light from a laser 10 is expanded and collimated into a beam 12 which is reflected from a beamsplitter 14 to the target at the left. The target consists of two plates 16 and 18 separated by a distance, d. The first plate 18 must be transparent; it does not matter whether the second plate 16 is or is not transparent so long as its inner surface 22 is light-reflecting. Surface 20 must also reflect light.

The returns from the target inner surfaces are directed collinearly with the incident beam and enter the interferometer 24 hitting the beamsplitter 26 therein. The interferometer 24 is of the Michelson type except that one of the plane mirrors is replaced by a stepped mirror 28. Light incident upon the beamsplitter 26 is split into two beams: one goes to the stepped mirror 28, is reflected back to the beamsplitter 26 and then goes to a recording means such as a low-resolution film 30; the other goes to the remaining plane mirror 32, is reflected back through the beamsplitter 26 to the recording film 30.

Figure 2:
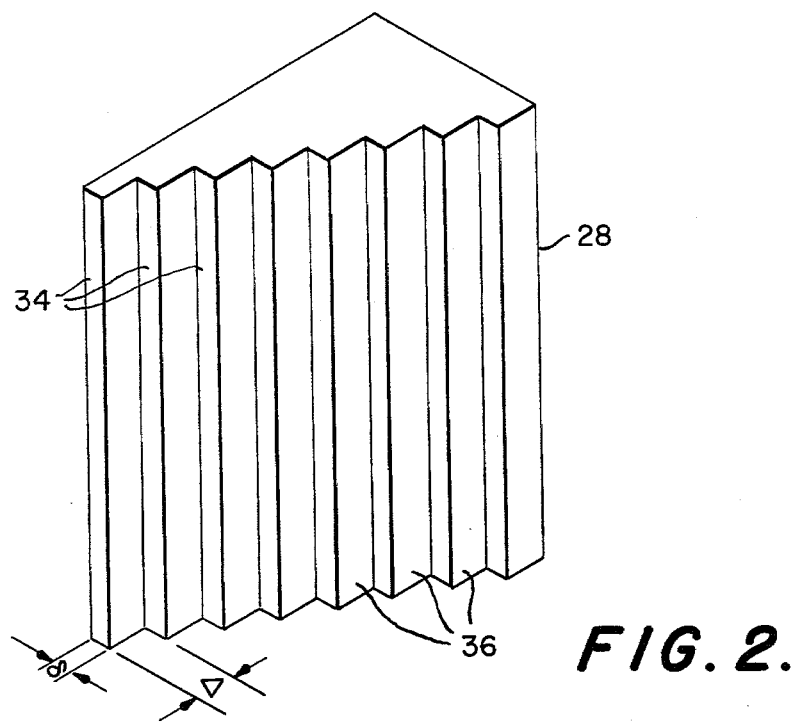
FIG. 2 is an isometric illustration of the stepped mirror.

FIG. 2 shows an enlarged view of the stepped mirror 28. (FIG. 1 is a top view of the apparatus.) The dimension of the light-reflecting surfaces 34 is $\delta$, the step height. The dimension of the cut-backs 36 of the steps is $\Delta$, the step depth. Ideally the light-reflecting surfaces 34 are all flat, parallel, mirror surfaces.

Figure 3:
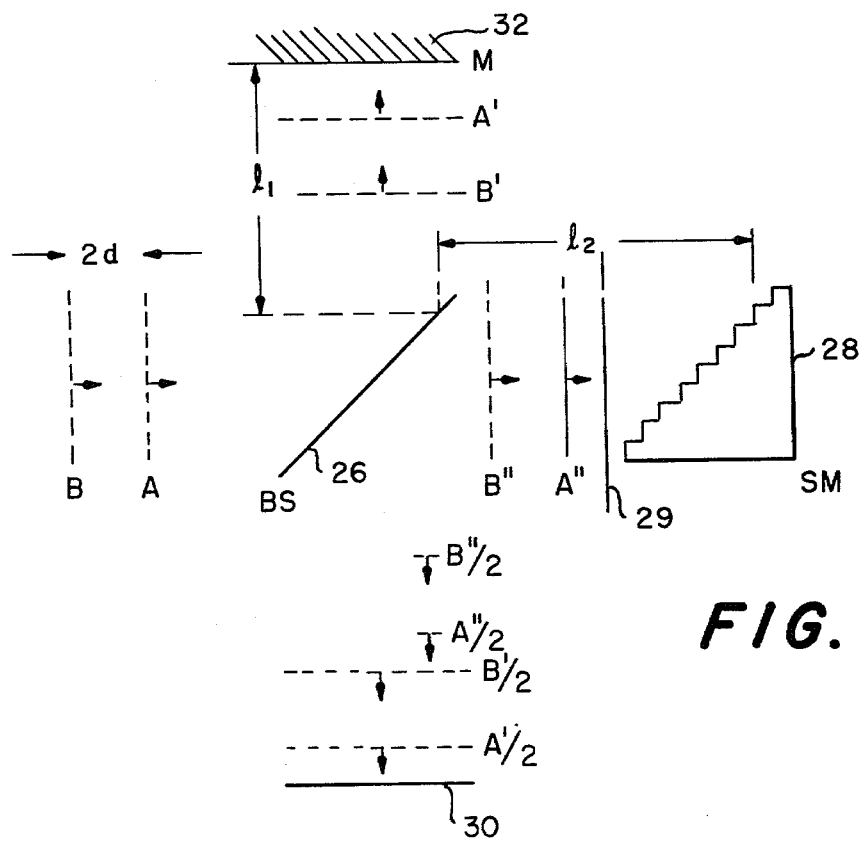
FIG. 3 is a schematic illustration of some of the relationships involved in the invention.

For simplicity, the return from the target can be considered to consist of two components, or wavefronts, A and B. The delay of component B with respect to A is twice the transit time between the two surfaces 20 and 22. In FIG. 3, the wavefronts are shown for the case where all but one of the steps of the mirror 28 are blocked. (The aperture 29 in FIG. 3 is for the purpose of illustrating the diagram and does not exist in the actual device, i.e., in the actual device, none of the steps are blocked.) If the laser has a short coherence length, there are three cases in which coherent summation can occur at the film plane in the region where the returns from the plane mirror 32 and the stepped mirror 28 overlap. These three cases are:

$$l_2 = l_1$$

$$l_2 = l_1 + d$$

$$l_2 = l_1 - d$$

where the distances $l_2$ and $l_1$ are the distances to the reflecting step and to the plane mirror, respectively, from the beamsplitter 26, as shown.

Figure 4:
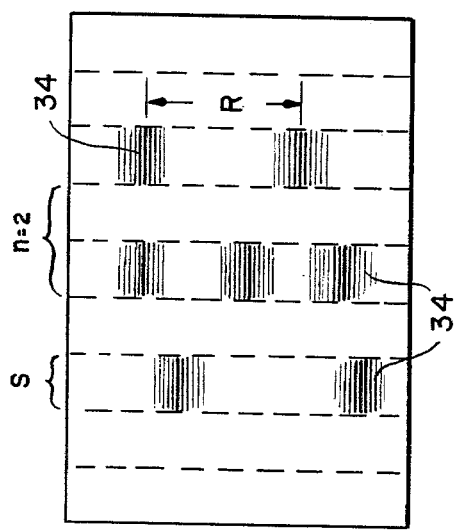
FIG. 4 is a view of the image on the film.

If the range spanned by the stepped mirror 28 covers $l_1 \pm d$ and if the step depth $\Delta$ is less than the coherence length, L, of the laser, the output in the film plane appears as shown in FIG. 4. The interference fringe regions are indicated by the numeral 34. The fringe spacing, R, in each channel is determined by the relative tilts of the mirrors.

The spacing between the two wavefronts A and B, and, hence, the spacing, d, between the optical surfaces, is determined by counting the number of channels, n, between the corresponding edges of two successive interference regions 34 and using the formula:

$$d = n\Delta$$

This formula is based on the assumption that the step height and step depth are equal. Other simple relations can be obtained if the height and depth are unequal. In FIG. 4, n=2, the width of a channel being indicated by the letter s.

In practice, the distance $l_1$ is adjusted for equal path length with either the extreme left or the extreme right channel of the stepped mirror, thus providing only the center and either the right or the left channel having interference fringes in FIG. 4. This provides a greater measurement range for d at the expense of one channel which only provides redundant information. The step depth, $\Delta$, is a compromise between the range of separations, d, to be measured, the desired resolution, the laser coherence length, and fabrication limitations. The step height, $\delta$, is a similar compromise and should also include a consideration of diffraction effects. The smaller $\delta$ is, the better the resolution but it becomes a more and more difficult fabrication problem as $\delta$ is made smaller. Also, the returned light from the steps spreads more as $\delta$ decreases, causing the reflected beams to overlap and the image to become unclear.

The accuracy of measurement depends on the laser coherence length and therefore the coherence length which is chosen will depend on the accuracy of measurement which is required or desired.

The separations between curved optical surfaces whose optical axes are coincident can also be measured by this method, since the curvature of the reflected wavefronts at the interferometer would be quite small.

Figure 5:
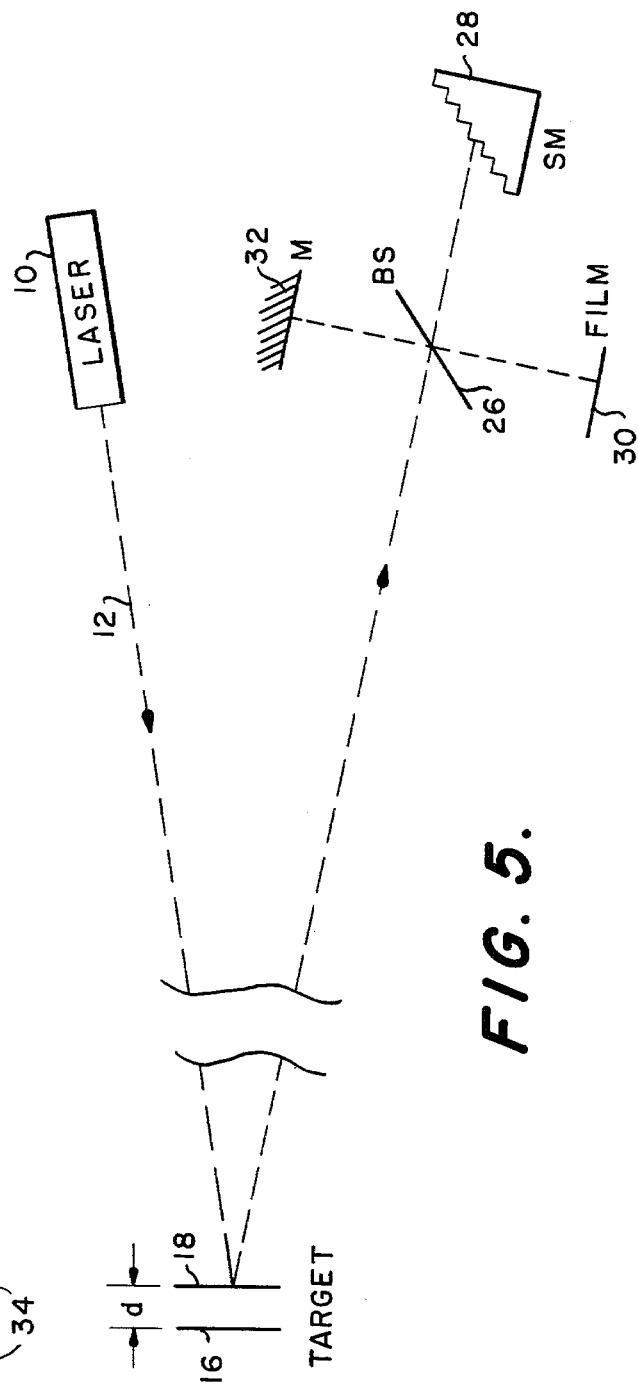
FIG. 5 is a second embodiment of the invention useful for longer-range measurements.

For long-range measurements, the embodiment shown in FIG. 5 is preferable. Here, no initial beamsplitter 14 is used but the beam 12 from the laser 10 is projected directly upon the target. The incident and reflected beams are practically coincident at long ranges where the laser and interferometer are at the same location.

Figure 6:
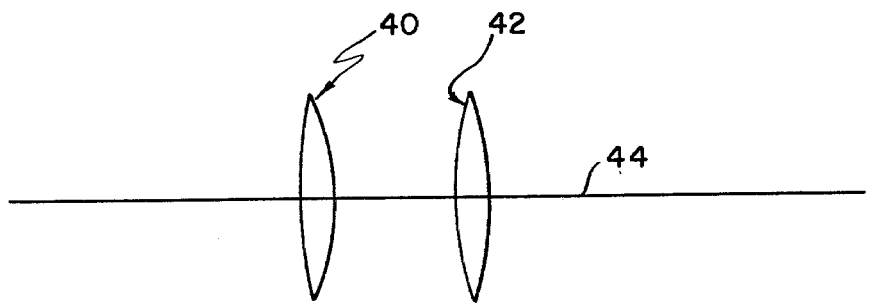
FIG. 6 is a schematic illustration of a target having spaced curved surfaces.

As shown in FIG. 6, the reflecting surfaces 40 and 42 of the target "plates" may be curved, so long as the optic axes are coincident (e.g., along line 44).

The laser light may range from the visible to infrared frequencies.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Apparatus for measuring the separation distance between two light-reflecting surfaces comprising, in combination:

means for irradiating a pair of spaced, light-reflecting surfaces with a laser pulse;

interferometer means comprising an interferometer of the Michelson type having stepped mirror means in place of one of the two usual plane mirrors therein, said interferometer being positioned to receive the light reflected from said two light-reflecting surfaces; and means for deriving the interference pattern produced by said interferometer, each step of said stepped mirror having a step height $\delta$, and a step depth $\Delta$, which are equal, the interference pattern containing a series of columns some of which have interference fringe regions therein, the number of columns between the corresponding edges of two successive interference regions being designated n, and the separation distance being obtained from the formula $$d = n\Delta$$

2. Apparatus as in claim 1, wherein said light-reflecting surfaces are curved, the optical axes of said surfaces being coincident.

3. Apparatus as in claim 1, said means for deriving the interference pattern being photographic film.

4. Apparatus as in claim 3, the light from the laser lying in the infrared spectrum and said film being sensitive to infrared radiations.

* * * * *